United States Patent
Kielmeyer

(10) Patent No.: US 6,391,444 B1
(45) Date of Patent: May 21, 2002

(54) CORE-SHEATH GLASS FIBERS

(75) Inventor: William Henry Kielmeyer, Englewood, CO (US)

(73) Assignee: Johns Manville International, Inc., Denver, CO (US)

(*) Notice: Subject to any disclaimer, the term of this patent is extended or adjusted under 35 U.S.C. 154(b) by 0 days.

(21) Appl. No.: 09/525,251

(22) Filed: Mar. 14, 2000

(51) Int. Cl.⁷ .................................................. D02G 3/00
(52) U.S. Cl. .................. 428/373; 428/369; 428/370; 428/371; 428/392
(58) Field of Search .................. 428/369, 370, 428/373, 374, 392, 371; 501/95.1

(56) References Cited

U.S. PATENT DOCUMENTS

| | | | | |
|---|---|---|---|---|
| 2,927,621 A | * | 3/1960 | Slayter et al. .................. 65/504 |
| 2,998,620 A | * | 9/1961 | Stalego .......................... 65/438 |
| 3,073,005 A | * | 1/1963 | Tiede ........................... 428/370 |
| 5,332,699 A | * | 7/1994 | Olds et al. ..................... 501/36 |
| 5,401,693 A | * | 3/1995 | Bauer et al. .................... 501/38 |
| 5,431,992 A | * | 7/1995 | Houpt et al. ................... 428/224 |
| 5,529,596 A | * | 6/1996 | Loftus et al. .................. 65/438 |
| 5,536,550 A | * | 7/1996 | Houpt et al. ................... 428/74 |
| 5,629,089 A | * | 5/1997 | Berdan, II et al. .......... 428/392 |
| 5,647,883 A | * | 7/1997 | Houpt et al. ................... 65/494 |
| 5,672,429 A | * | 9/1997 | Berdan, II et al. .......... 428/401 |
| 5,683,810 A | * | 11/1997 | Babbitt et al. ............... 428/370 |
| 5,714,421 A | * | 2/1998 | Olds et al. ..................... 501/36 |
| 5,723,216 A | * | 3/1998 | Houpt et al. ................... 428/374 |
| 5,770,309 A | * | 6/1998 | Houpt et al. ................... 428/398 |
| 5,786,082 A | * | 7/1998 | Evans et al. ................... 428/369 |
| 5,932,499 A | * | 8/1999 | Xu et al. ........................ 501/35 |
| 5,972,500 A | * | 10/1999 | Gross et al. ................... 428/370 |
| 5,981,414 A | * | 11/1999 | Bauer et al. .................... 501/38 |
| 6,107,224 A | * | 8/2000 | Xu et al. ........................ 501/35 |

* cited by examiner

*Primary Examiner*—Cynthia H. Kelly
*Assistant Examiner*—J. M. Gray
(74) *Attorney, Agent, or Firm*—Robert D. Touslee

(57) ABSTRACT

Provided is a glass fiber prepared by combining two glasses, preferably at least one of which is biosoluble, in a core/sheath arrangement. Such an arrangement can provide fibers potentially stronger than those of single glasses, while also having a permanent twist or curl to impart improved loft and recovery to blankets or mats comprised of them. Preferably, the core is offset from the center of the fiber. In one embodiment, the glass fibers of the present invention comprise a core and a sheath, where the core glass of the structure contracts as it cools to a greater extent than the sheath glass of the structure. Benefits are achieved in this manner, preferably with regard to biosoluble fibers.

12 Claims, 8 Drawing Sheets

CORE-SHEATH GLASS FIBERS

BACKGROUND OF THE INVENTION

1. Field of the Invention

The present invention relates to glass fibers. More preferably, the present invention relates to strong glass fibers having a permanent twist to thereby offer improved loft and recovery. The present invention relates to such novel glass fibers which are comprised of two glasses in a core/sheath relationship and a method of making same.

2. Description of the Related Art

Small diameter glass fibers are useful in a variety of applications including acoustical or thermal insulation materials. When these small diameter glass fibers are properly assembled into a lattice or web, glass fibers which individually lack strength or stiffness can be formed into a product which is quite strong. The glass fiber insulation which is produced is lightweight, highly compressible and resilient. For purposes of this patent specification, the term "glass" is intended to include any of the glassy mineral materials, such as rock, slag and basalt, as well as traditional glasses.

In the shipping and packaging of glass products, high compressibility is required. It is desirable to compress the glass products for shipping and then have them recover rapidly and reliably to the desired size. For example, to economically ship high-efficiency air-filter media from U.S. production operations to foreign countries, it is desirable to compress the media as tightly as possible to maximize the number of units in a shipment. When unpackaged, however, the product must recover to meet the high filtration efficiencies and other properties customers expect. The same is true for insulation products. Current insulation products are limited in the amount of compression possible while still attaining adequate recovery. When the product is compressed, the binder holds firm while the fibers themselves flex. As the stress upon the fiber increases due to excessive compression, the fiber breaks.

Attempts have been made in the prior art to produce non-straight glass fibers to thereby provide loft and resiliency in the glass products. In a mechanical kink process, glass fibers are pulled from a textile bushing. While still at high temperatures, the fibers are pulled by mechanical means through a series of opposed gears or a crimping device to attenuate and crimp them. The net result is a bundle of kinked glass fibers.

The major disadvantage to mechanical kinking is that the fibers are not conducive to satisfactory glass mat production. Every fiber produced in this manner has a uniform shape, defeating the purpose of the kink. Further, the process has an unsatisfactory low throughput.

U.S. Pat. No. 2,998,620 discloses curly glass fibers of bicomponent glass compositions. The patent discloses producing staple curly fibers by passing two glass compositions of differing thermal expansivity through the orifices of a spinner. The glasses are extruded as a dual glass stream in aligned integral relationship such that the fibers curl naturally upon cooling due to the differing thermal expansivity.

U.S. Pat. No. 5,536,550 describes the manufacture of bicomponent curly glass fibers by co-fiberization of two distinct glasses having coefficients of thermal expansion (CTE) which are sufficiently different that upon cooling, the internal stress created by the differences in the CTEs of the glasses cause attenuated fibers to curl. To generate different CTEs, different glass chemistries are used.

U.S. Pat. No. 3,073,005 discloses a non-rotary process for making bicomponent curly glass fibers. The fibers are made by feeding differing glass compositions to an orifice in side by side contact such that the two glasses are attenuated into a single fiber.

U.S. Pat. No. 2,927,621 also discloses the production of curly fibers. The patent discloses a process wherein glass fibers of a single glass composition are passed through opposed contoured skirts after the fibers have been softened by hot gases. The fibers then take on the shape of the contour of the skirts.

U.S. Pat. No. 5,529,596 discloses a method for making dual-glass fibers by causing one glass to flow around another glass as they are spun from a rotating spinner. The dual-glass fibers are formed from glasses having differing softening points. The glass mat prepared is passed through an oven to heat the web to a temperature greater than the softening point of the lower softening point glass, but less than the softening point of the second glass. This enables the one glass to soften and act as a binder, bonding the glass fibers to each other.

U.S. Pat. No. 5,629,089 discloses a dual glass fiber insulation product, which includes irregularly-shaped glass fibers. The glass fibers are made of two different glasses having different coefficients of thermal expansion. A cross-section of the fibers shows the two glasses side-by-side, with an interface between the two glasses. Because the two glasses have different coefficients of thermal expansion, one glass will contract more than the other on cooling, causing the fiber to bend. The irregular shaped fiber differs from a helical fiber in that the rotation of the fiber is not constant, but rather varies irregularly both in direction and in magnitude. See also U.S. Pat. No. 6,017,835.

While the prior art has provided methods and glass fibers appropriate for rendering glass products resilient, improvements are still needed. The past twenty years have seen major restrictions placed on the properties of glasses used to make glass fibers. Material and operational costs have narrowed the number of major glass components down to less than ten, and concerns over health and safety have placed additional restrictions on the levels of these components in glass formulae. At the same time, the demand for better product performance has not softened; if anything, it has increased. Furthermore, the factions of health and safety are frequently at odds with product performance. The U.S. and European markets are especially sensitive to the use of what it deems as potentially hazardous materials in air filtration and other applications. Improving the capabilities of fiberglass products while trying to make the glass more biosoluble involves compromises in glass chemistry, compromises that generally make a new glass weaker structurally than fiberizable glass used in the past. Moreover, there are more expensive, but seemingly less hazardous, competitive materials waiting in the wings for the opportunity to take market share from many fiberglass products. It is, therefore, desirable to invent a glass fiber that offers a combination of safety and improved product performance, without major modifications to existing processing methods.

Accordingly, it is an object of the present invention to provide a novel glass fiber which exhibits good product performance while also offering good health and safety properties.

It is another object of the present invention to provide a process for preparing such novel glass fibers.

It is yet another object of the present invention to provide a novel glass fiber which exhibits good biosolubility, good strength, while also having a permanent twist or curl to impart improved loft and recovery.

These and other objects of the present invention will become apparent on review of the following specification, the figures of the drawing, and the claims appended hereto.

SUMMARY OF THE INVENTION

The glass fiber of the present invention involves the combining of two glasses, preferably at least one of which is biosoluble in a core/sheath arrangement. Such an arrangement can provide fibers potentially stronger than those of single glasses, while also having a permanent twist or curl to impart impoved loft and recovery to blankets or mats comprised of them. In one embodiment, the glass fibers of the present invention contain a core and a sheath, where the core has a lower $T_g$ so that the core glass would independently tend to shrink more on cooling than the sheath glass. Benefits are achieved in this manner, preferably with regard to biosoluble fibers.

In preparing the fibers of the present invention, one glass is entrained within the second during fiber formation, or in a process step prior to fiberization. The core/sheath relation occurs regardless of glass properties as the outer glass is forced around the inner core in the process of the present invention. The hole sizes used in the formation are selected to allow the glasses to flow properly, taking into account the glass properties.

The entrained, or "core", glass preferably has a tendency to shrink more on cooling than the outer, or "sheath" glass. This differential tendency for shrinkage puts the outer glass under compression, making the fiber stronger than it would be if comprised of the sheath glass alone. Moreover, as the outer glass is placed under compression, the core glass is put under tension. It is believed that such thermally stressed fibers, if inhaled, are more susceptible to breakdown within the lungs than non-stressed fibers. In vitro tests on similar fibers show a two-phase mechanism of fiber dissolution, a chemical leaching phase followed by a mechanical collapse of the structure. It is believed that body fluids would attack the stretched bonds of the glass and remove certain components. The remaining bonds relax and, in the process, distort and crack the weakened structure of the fiber.

Permanent curl is preferably provided by offsetting the longitudinal axis of the cylinder of core glass from the longitudinal axis of the fiber. In this case, the fiber is under more compression on the side closest to the core glass than the opposite side, which differential causes the fiber to curl. Imparting permanent curl in such a manner also aids in the biosolubility of the glass fiber.

In another embodiment, there is provided a novel method for preparing the core/sheath glass fibers of the present invention. The core/sheath and offset core/sheath fibers can be manufactured via both pot-and-marble flame-attenuated and rotary spinning processes. Many benefits are realized by the core/sheath and offset core/sheath fibers of the present invention relative to the other kinds of curly fibers.

BRIEF DESCRIPTION OF THE FIGURES OF THE DRAWING

FIG. 11 of the Drawing depicts a planar view of one side of an externally heated core-sheath pot where the divider between the core glass and sheath glass compartments is more funnel-like.

DETAILED DESCRIPTION OF THE PREFERRED EMBODIMENTS

Figure 1:
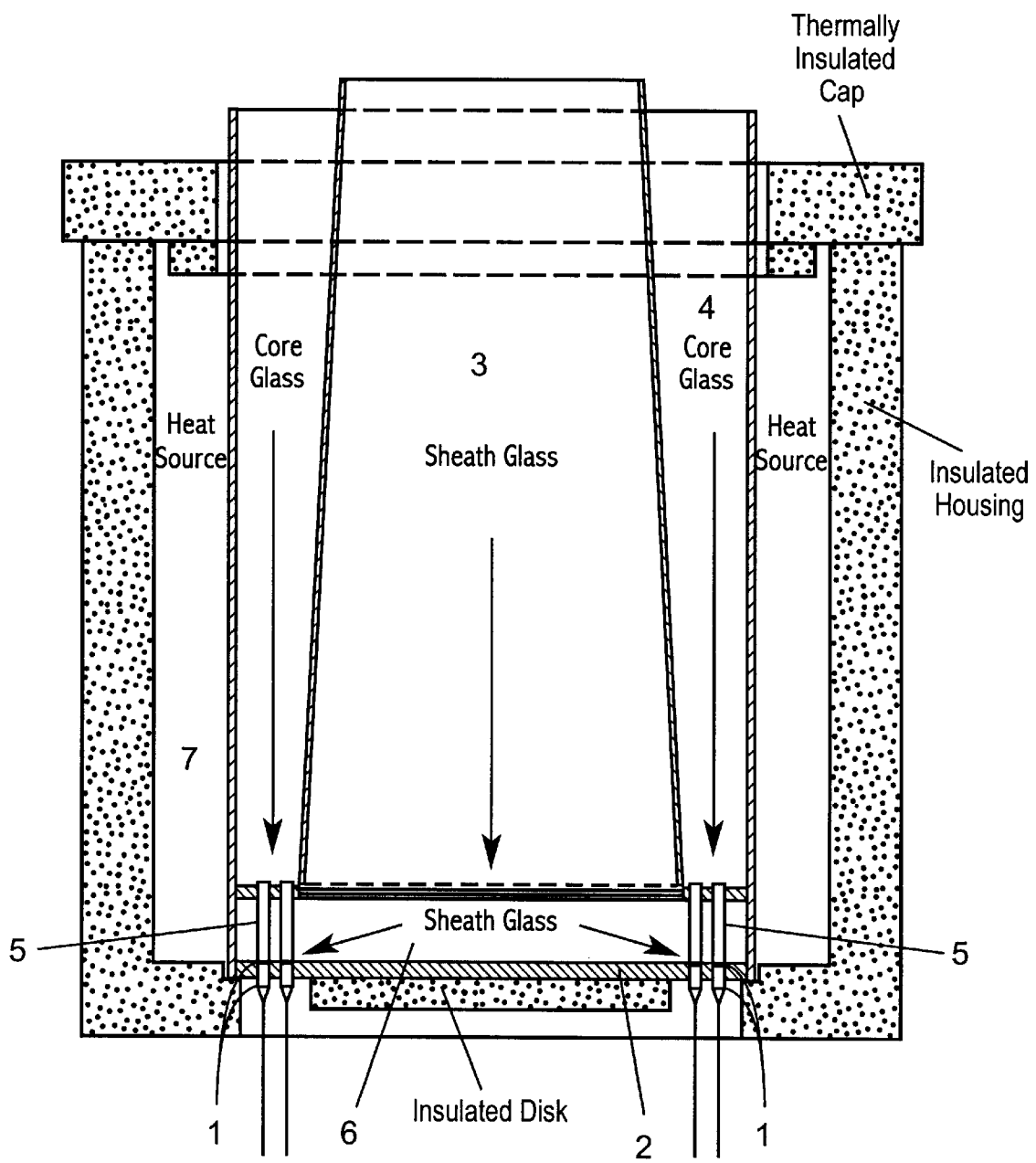
FIG. 1 of the Drawing depicts a planar view of one side of an externally heated core-sheath pot useful in preparing the fibers of the present invention.

In one preferred embodiment, the present invention relates to biosoluble fibers having improved biosolubility properties. In accordance with the present invention, the procedure used to evaluate biodissolution rate is similar to that described in Law et al. (1990). The procedure consists essentially of leaching a 0.5 gram aliquot of the candidate fibers in a synthetic physiological fluid, known as Gamble's fluid, or synthetic extracellular fluid (SEF) (simulated physiological fluid) at a temperature of 37° C. and a rate adjusted to achieve a ratio of flow rate to fiber surface area of 0.02 cm/hr to 0.04 cm/hr for a period of up to 1,000 hours duration. Fibers are held in a thin layer between 0.2 gm polycarbonate filter media backed by plastic support mesh and the entire assembly placed within a polycarbonate sample cell through which the fluid may be percolated. Fluid pH is regulated to 7.4+0.1 through the use of positive pressure of 5% $CO_2$/95% $N_2$ throughout the flow system.

Elemental analysis using inductively coupled plasma spectroscopy (ICP) of fluid samples taken at specific time intervals are used to calculate the total mass of glass dissolved. From this data, an overall rate constant could be calculated for each fiber type from the relation:

$$k_{dis} = [d_o (10 M/M_o)^{0.5}]/2t$$

where $k_{dis}$ is the dissolution rate constant in SEF, $d_o$ the initial fiber diameter, the initial density of the glass comprising the fiber, $M_o$ the initial mass of the fibers, M the final mass of the fibers (M/$M_o$=the mass fraction remaining), and t the time over which the data was taken. Details of the derivation of this relation is given in Leineweber (1982) and Potter and Mattson (1991). Values for $k_{dis}$ may be reported in ng/cm$^2$ hr and preferably exceed a value of 50. Replicate runs on several fibers in a given sample set show that k values are consistent to within 3 percent for a given composition. Data obtained from this evaluation can be effectively correlated within the sample set chosen dissolution data used to derive $k_{dis}$'s were obtained only from experimental samples of uniform (3.0 μm) diameter and under identical conditions of initial sample surface area per volume of fluid per unit time, and sample permeability. Data was obtained from runs of up to 30 days to obtain an accurate representation of the long term dissolution of the fibers.

The glass fibers of the present invention comprise a core glass and an outer sheath glass which encompasses the core. The core glass for the biosoluble fibers of the present invention has a tendency to shrink more on cooling than the sheath glass, i.e., the total differential contraction of the core glass would be greater than that of the sheath glass if it were independent of the sheath glass. In other words, the core glass of the structure, if isolated from the sheath glass, would contract to a greater extent than the sheath glass, if the sheath glass is also unconstrained and cooling at the same rate, in a temperature range where the sheath glass is essentially rigid, such as below its transformation temperature. Generally, the core glass will have a higher CTE than the sheath glass. The differential tendency to shrinkage puts the outer glass under compression, making the fiber stronger. This also allows the core glass to comprise a weak glass fiber which readily breaks down, allowing the fiber to more readily be dissolved in the body. Such fibers can be prepared by either pot-and-marble techniques or by rotary spinner technique in accordance with the present invention.

In another preferred embodiment, the present invention relates to a core/sheath fiber with an off-center core. Particular advantages are achieved when the core/sheath fiber is prepared with an off-center core. Such fibers exhibit major benefits in the manufacture of the fibers, particularly as compared to side-by-side techniques. The off-center core fibers of the present invention can result in a fiber with a permanent twist or curl, which imports improved loft and recovery to mats. Such off-center core fibers are also of particular advantage in biosoluble fibers.

For example, in the offset core/sheath process of the present invention, the glass with the higher rate of contraction on cooling is preferentially surrounded by the other glass. So, even structurally and chemically weak glasses can be used to make up the interior of an offset core/sheath fiber; in fact, these are particularly desirable for applications requiring a very biosoluble fiber, such as one conforming to Wardenbach 40 requirements. A weak glass with a low rate of contraction can also be used for the sheath of such a fiber, because the compression it is placed under improves its strength and chemical resistance. Also, a wide range of glass combinations is theoretically possible, because the two melts only come into contact briefly at the base of a pot and at the sides of a spinner; thus, the opportunity for reaction between the two glasses is greatly reduced.

Furthermore, in the pot and marble process, process parameters for producing core/sheath fibers are largely controllable and, consequently, the characteristics of the fiber are more predictable. The amount of offset of the core glass from the axis of a primary/fiber is fixed by the design of the pot; the diameter of the core glass relative to the primary/fiber diameter is controlled by the characteristics of the two glasses used and the relative sizes of the core and sheath glass tips (again a pot design consideration); and, with any given pot and glass pair on the same machine operating under the same conditions (assuming negligible tip wear or distortion of the pot), similar product properties should be achieved when the same size of fiber is generated.

In a rotary operation, the same holds true. With a specially designed spinner and independently flowing streams of molten glass, offset core/sheath glass fibers can be formed with definable properties in much the same way as single glass fibers are produced from a spinner.

The preparation and processing of the fibers of the present invention offers many advantages over conventional side-by-side configured fibers. For example, in the side-by-side configuration, both glasses are exposed to their service environment (except for the interfacial surface joining them). The glass in the fiber with the higher rate of contraction on cooling typically contains relatively large amounts of alkali oxides and is chemically weaker than the other glass. Moreover, because it is under tension it is more susceptible to chemical attack than under no strain. The combination of reasonable biosolubility, durability in a wide variety of service conditions, and high CTE places large restrictions on the range of chemical compositions useful for the glass under tension in the fiber. In the offset core-sheath fiber, of the present invention, as discussed above, the exterior of the fiber consists of one glass, which can more easily be formulated to adapt to its service environment. Moreover, this glass is under compression, enhancing fiber strength and durability. As discussed above, structurally and chemically weak glasses can be used to make up the interior of an offset core-sheath fiber; in fact, these are particularly desirable for applications requiring a very biosoluble fiber, such as one with a mandated short half-life in body fluids. Even a comparably weak glass with a low rate of contraction can be used for the sheath of such a fiber under some circumstances, due to the improvement in strength and chemical resistance caused by its compressed structure.

The wide range of possible glass pairs that can be used in an offset core/sheath fiberization system and the consistency of the primary/fibers produced by this method offer another advantage in that glasses with widely varying fiberization temperatures can be coupled. Combining two glasses with widely different fiberization temperatures in a side-by-side configuration, for example, can cause uncontrollable and unpredictable products in a flame attenuation process. The softer glass can wrap around the harder glass in the flame or spall off, producing beads or glass shot. In either case, the formation of desirable curly fibers is impaired. However, in a pot-and-marble or other flame attenuation process making core-sheath fibers, in accordance with the present invention, shot (small glass beads) will not be produced as long as the softer glass, the one with the lower fiberization temperature, constitutes the core. Moreover, by "confining" the softer glass in the shell of the rigid glass, core-sheath fiberization, in either a flame attenuation or rotary process, can take advantage of the very high contraction rate of the core glass above its transformation temperature, if the sheath glass hardens at a higher temperature than the core. Although the difference in transformation temperatures between the core and sheath glasses may not be as large as the range of temperatures that both glasses are rigid, the differential contraction between the plastic core and rigid sheath glasses can be substantial and contribute greatly to the overall stress pattern in the fiber at room temperature.

Figure 2:
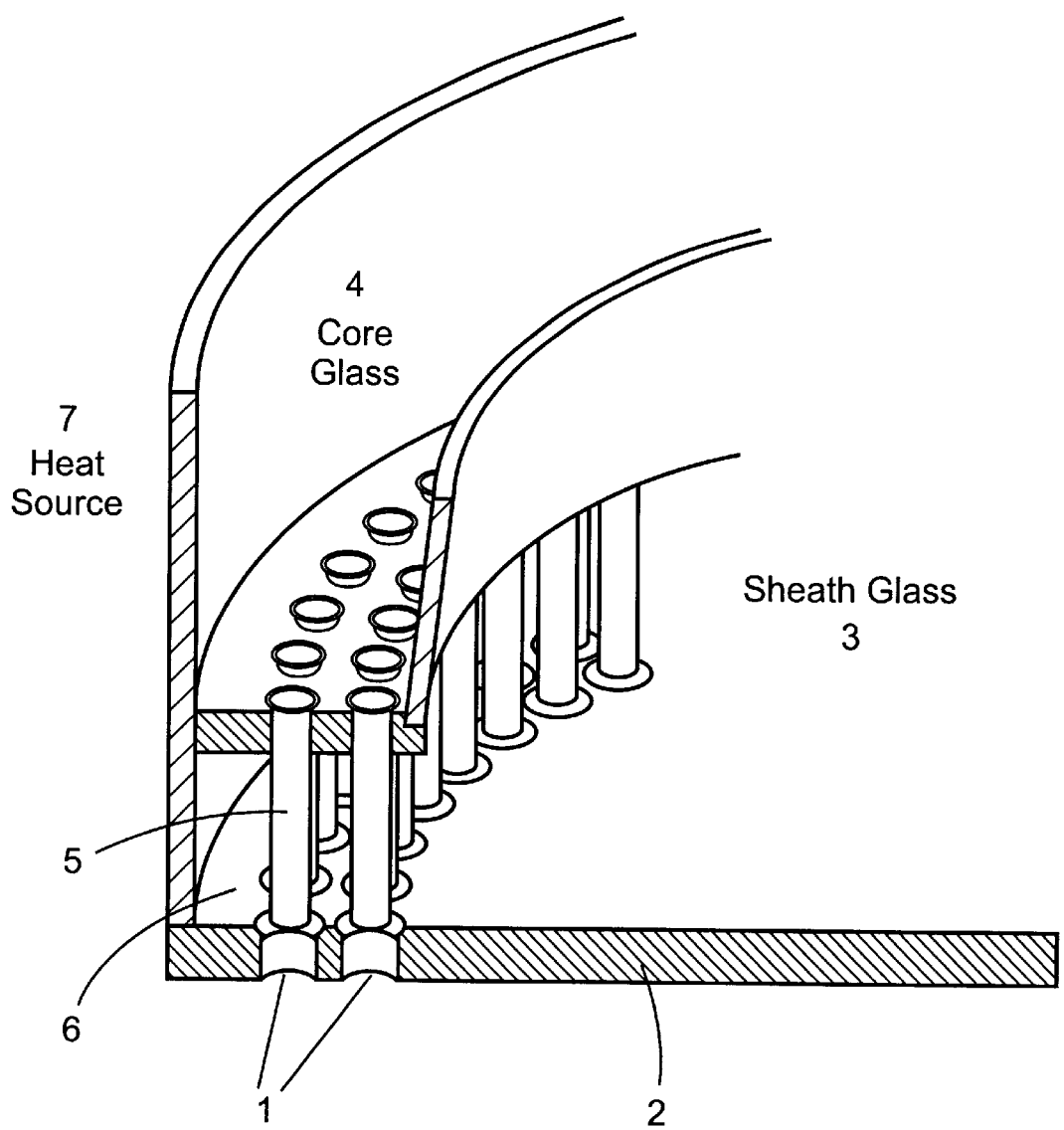
FIG. 2 of the Drawing depicts the base of an externally heated core-sheath pot.

The pot design for a concentric or offset core/sheath fiber in accordance with the present invention is relatively simple. FIGS. 1 and 2 show one preferred design for a core/sheath pot. FIG. 1 shows a planar cross-section of the side of the pot; FIG. 2 shows a three-dimensional view of a section of the pot near the base. In FIG. 1, the base of the pot contains tips; in FIG. 2, the base has no tips. In the design of FIGS. 1 and 2, the pot is externally heated.

Figure 11:
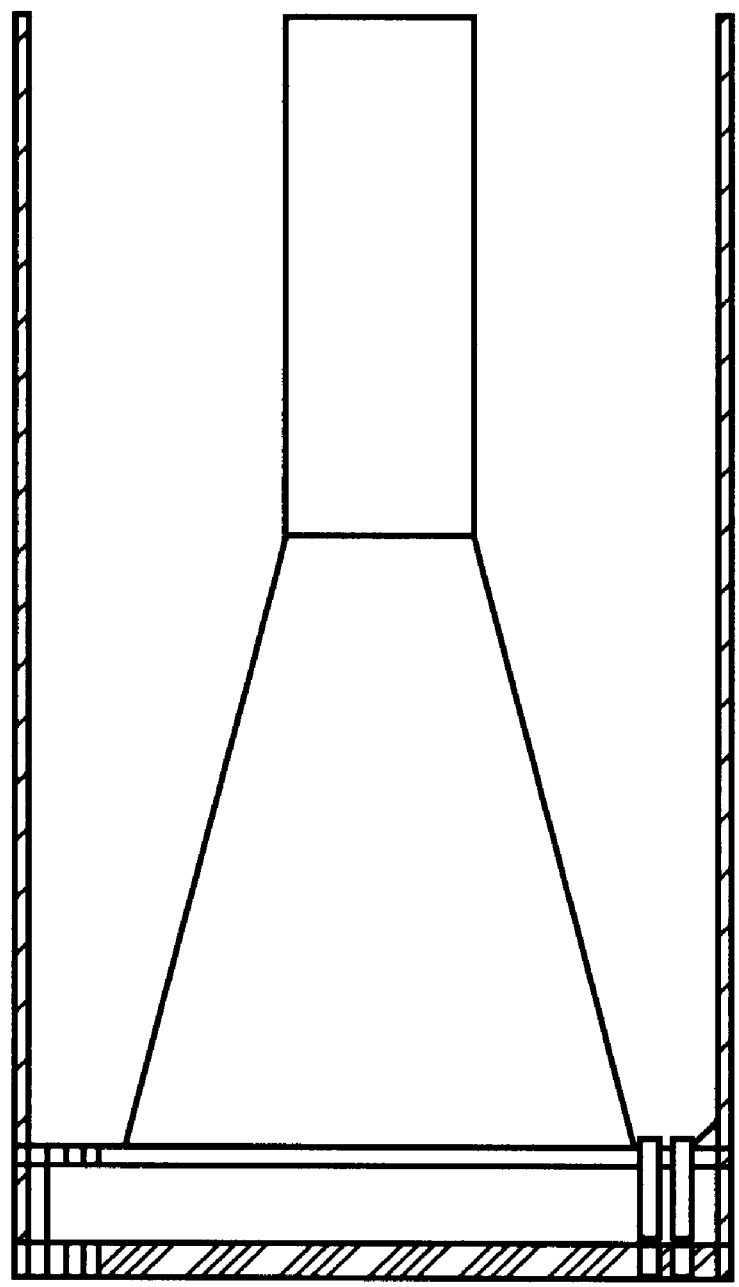

In FIG. 1, the pot is cylindrical in design with rows 1 of holes or tips near the perimeter of the base 2. (Another preferred pot design is shown in FIG. 11 wherein a more funnel-like separator between the sheath glass and core glass compartments is used. A cylindrical divider can also be used.) The core/sheath pot contains two compartments, a central one 3 containing the sheath glass and an outer one 4 containing the core glass. The core glass is fed to the base holes or tips 1 through a series of internal tips 5 that extend from the bottom of the core glass compartment to just above the pot holes or tips. Each base hole or tip has an internal tip above it. The sheath glass flows in a small region 6 beneath the core glass compartment, around the internal tips, and out through the base holes or tips 1, encapsulating the core glass in the process. The heat source 7 is external.

In FIG. 2, the base 2 is shown with the holes 1 (no tips in FIG. 2) through the base. The control sheath glass compartment 3 and the outer core glass compartments are shown, with the internal tips that extend from the bottom of the core glass compartment to just above the pot holes. The sheath glass flows in the region 6 around the internal tips and out through the base holes 1.

Figure 3:
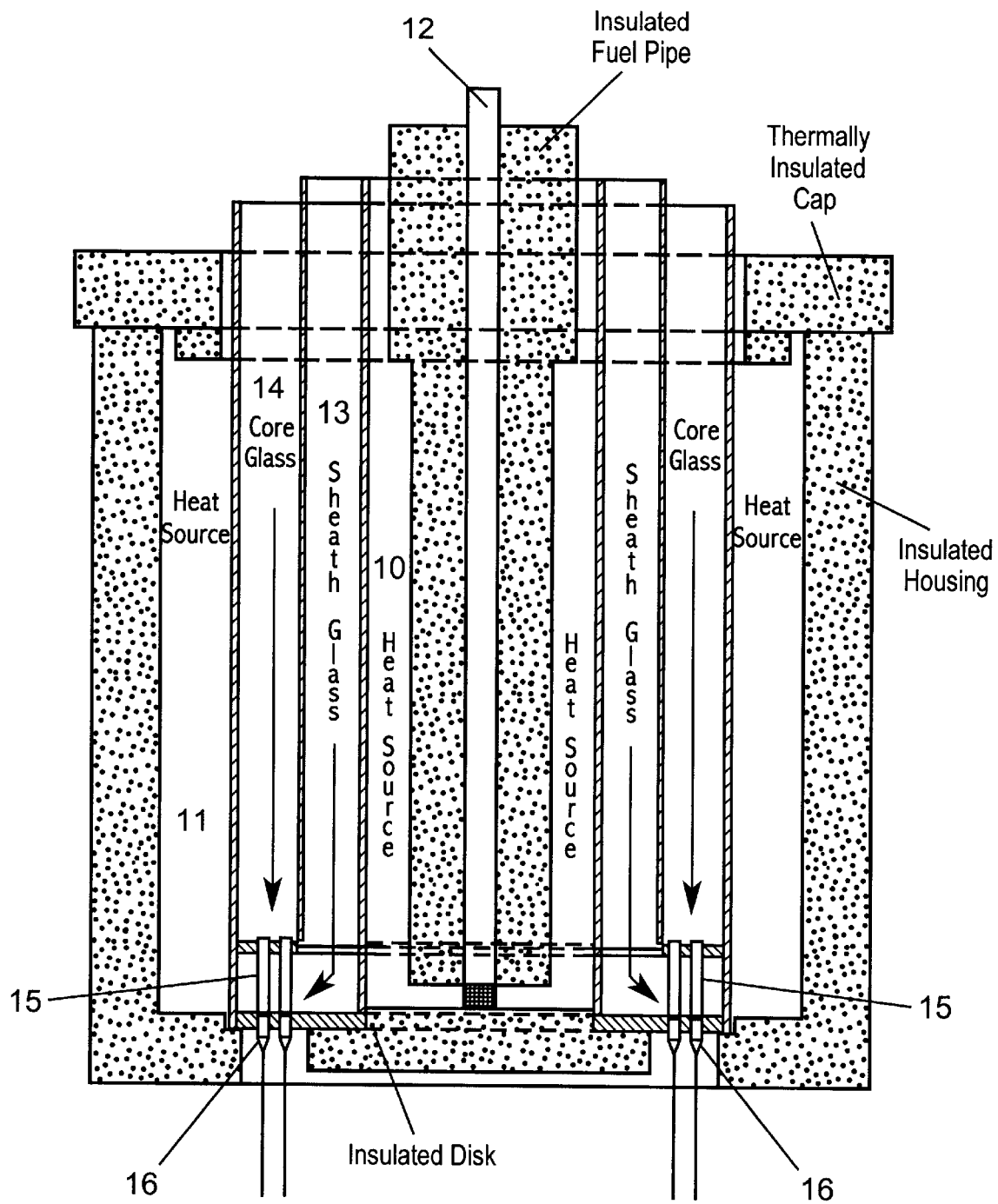
FIG. 3 of the Drawing depicts a planar view of one side of an internally and externally heated core-sheath pot.

FIG. 3 shows a design of a pot that facilitates both internal 10 and external 11 heating. Internal heating, created by fuel pipe 12, may be required to enhance the flow of the sheath glass in compartment 13, internal relative to core glass compartment 14. Otherwise, this pot functions like the externally heated one. It should be noted that if the central axis of each internal tip 15 coincides with the axis of a hole or tip 16 beneath it, the core glass in the primary will most likely be centrally positioned in the primary. If the core glass contracts on cooling more than the sheath glass, the primary will display improved strength, but no curl. If, however, the axis of each internal tip 15 is offset from the axis of the corresponding opening in the base of the pot 16, the primary will likely display both improved strength and a tendency to twist or curl coming from the opening.

It is recognized by those familiar with the art that, to produce fibers, filaments or primaries emanating from the external holes or tips 1 in the pots of FIGS. 1, 2, 3, and 11 are subjected to secondary attenuation (not shown) by the impact of high-velocity hot gases. Typically the gases act on the filaments from the side, causing them to change direction and stretch to a much finer diameter. Fibers produced from the secondary attenuation have essentially the same core-sheath relationship as the primaries.

In a rotary operation, it is generally understood, as described in Houpt et al (U.S. Pat. No. 5,431,992) that, for side-by-side fibers, separate molten glass streams impinge on separate horizontal plates in a spinner, one generally on the base plate of the spinner and the other on a plate above the base. From the point of impact they are driven to the side wall of the spinner and progress vertically upward (or at an incline) through separate channels with dividing walls that bridge the vertical rows of holes. The glasses come together as they emerge from the holes.

Figure 9:
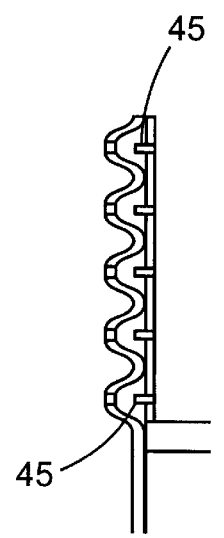
Figure 10:
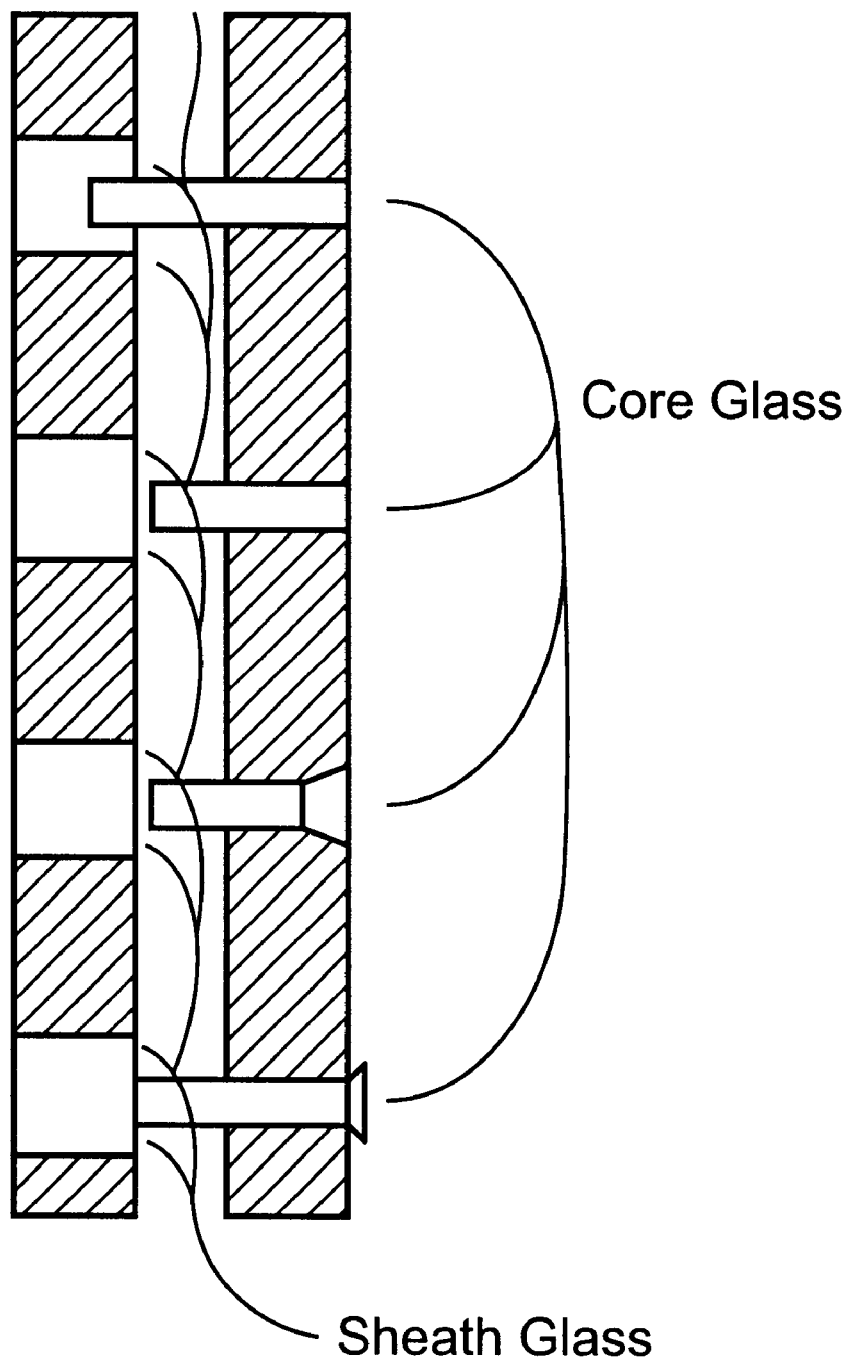
FIG. 10 of the Drawing depicts the glass flow and fiberization patterns in the spinner design of FIGS. 7–9.

The rotary spinner of the present invention also has two separate molten glass streams impinging on separate horizontal plates, one preferably the base plate and the other a plate above the base. The rotation of the spinner also drives the two glasses to the sidewalls of the spinner and upward along separated channels or compartments. However, this is where the similarity ends. The formation of side-by-side fibers according to the prior art requires that each channel is as wide at the spinner side wall as the distance between vertical rows of holes at the vertical dividing wall, that every other channel carries the same glass, and that a single vertical wall separates the glasses and bridges the holes or separates two holes in close proximity. Moreover, the movement of glass in the channels is essentially vertical prior to exiting the holes. In the core/sheath sidewall configuration of the present invention, the vertical channels or compartment bearing one glass, the sheath glass, extend from each vertical row of holes to the next one all the way around the outside of the spinner, that is, the channels carrying both glasses do not alternate between vertical rows of holes. The channels transporting the core glass converge on each vertical row of holes at a single line and contain smaller holes that match the number and location of, and may be concentric or slightly off-center from the holes on the outer wall of the spinner. It is not essential that the sheath glass flows around the core glass. Rather, the spinner sidewall is designed such that the sheath glass either flows laterally from opposite directions before exiting the holes or it approaches the hole from all directions so that, in either case, the two glasses are co-extruded such that the sheath glass surrounds the core glass. FIGS. 9–10 of the Drawing show several designs that can achieve this.

Figure 4:
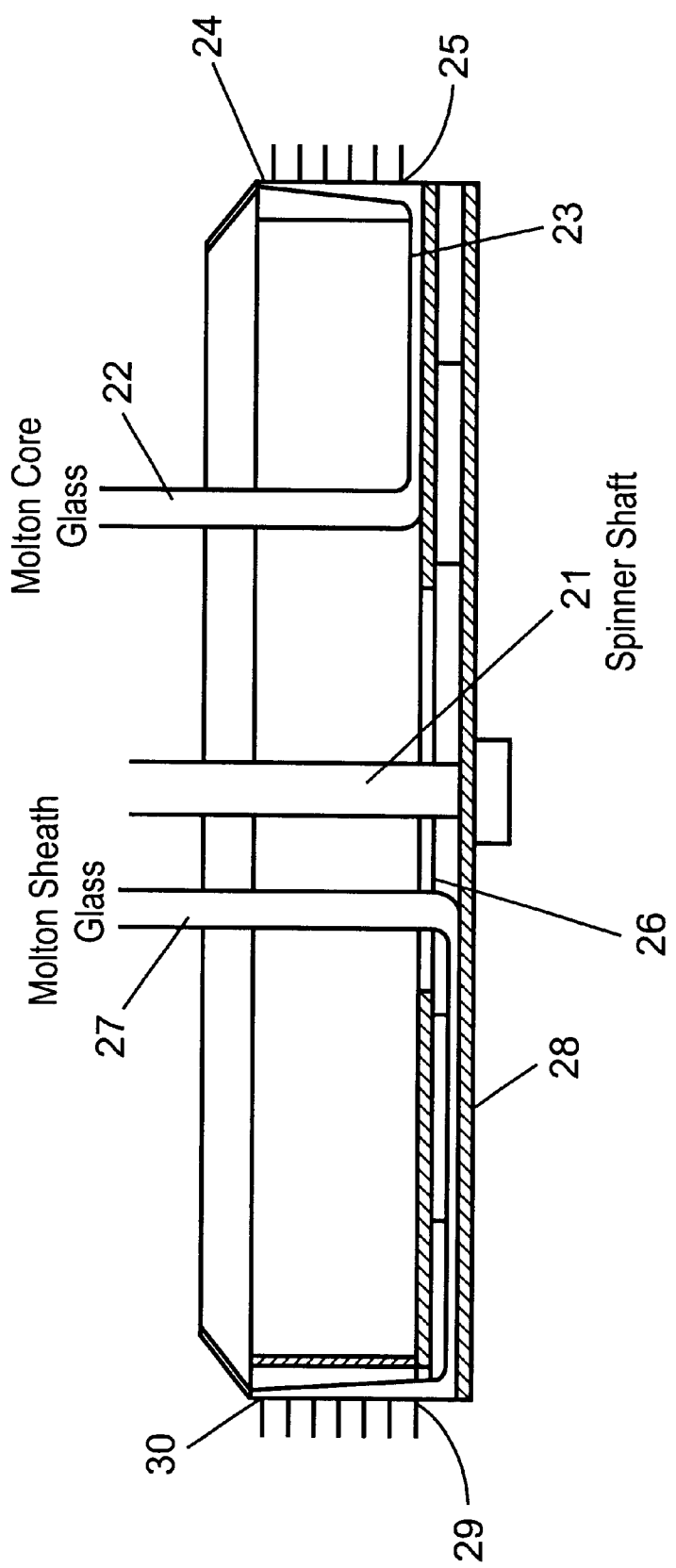
FIG. 4 of the Drawing depicts a spinner useful in preparing the core-sheath fibers of the present invention.

FIG. 4 shows one useful spinner design. As the spinner rotates rapidly, around spinner shaft 21, a stream of molten core glass 22 falls on the top 23 of two circular horizontal plates and is directed toward a vertically pleated metal wall 24. The core glass exits through holes 25 in the extreme apices (creases) of the pleats. This plate has a circular opening 26 in its center through which a stream of molten sheath glass 27 passes and falls on the lower horizontal plate 28, the base of the spinner. The sheath glass processes to the external wall 29 of the spinner and passes upward through channels formed by the pleated sidewalls of the core glass compartment and exits through holes 30 in the spinner sidewall across from those through which the core glass pass. The sheath glass from one channel converges with the sheath glass from an adjacent channel to exit through holes common to both channels. In the process, the sheath glass encases the core glass streamlets exiting holes in the pleats across from the holes through which the sheath glass pass.

Figure 5:
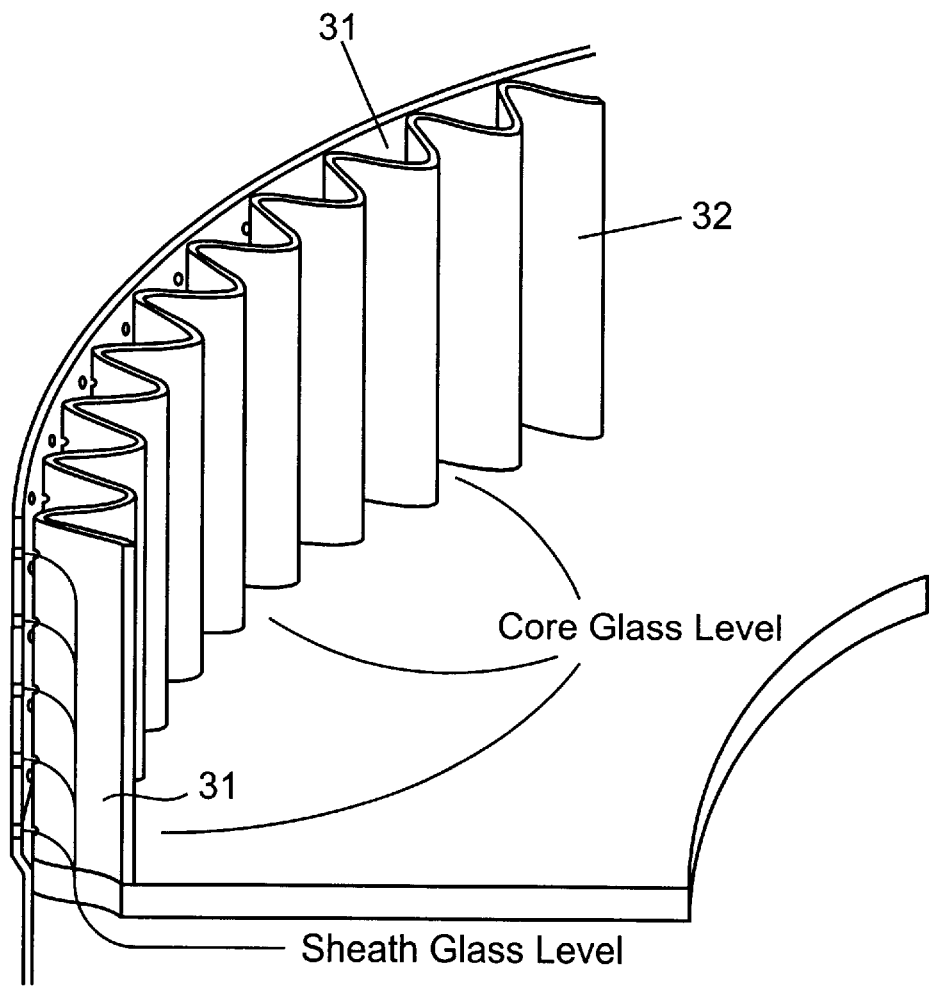
FIG. 5 of the Drawing depicts the vertically pleated wall of the spinner of FIG. 4.

In FIG. 5, the holes in the pleated wall are simple. The channels 31 for the sheath glass are shown in the pleated sidewall 32 of the core glass compartment. A variation of this design can include the holes in the pleated walls being tipped 33 or otherwise extended into the space between the pleated walls and the external sidewall, as shown in FIG. 6.

Figure 6:
FIG. 6 of the Drawing depicts an alternative embodiment of the vertically pleated wall.

FIGS. 5 and 6 show that the walls of the two glass compartments are separated. This is not essential as the pleated sidewall of the core glass compartment may physically touch or extend into the external sidewall of the spinner. In this design, there must be a sufficient opening at the edges of the intervening walls for the sheath glass to pass on both sides of the core glass holes. This can be accomplished by putting a pair of holes in adjacent channels around each core glass hole that now extends to the outer wall. In this case the glasses would merge externally to the spinner sidewall. Of course, a large hole in the external sidewall or a series of notches in the edges of the pleated walls around the core-glass holes would accomplish the same thing.

Figure 7:
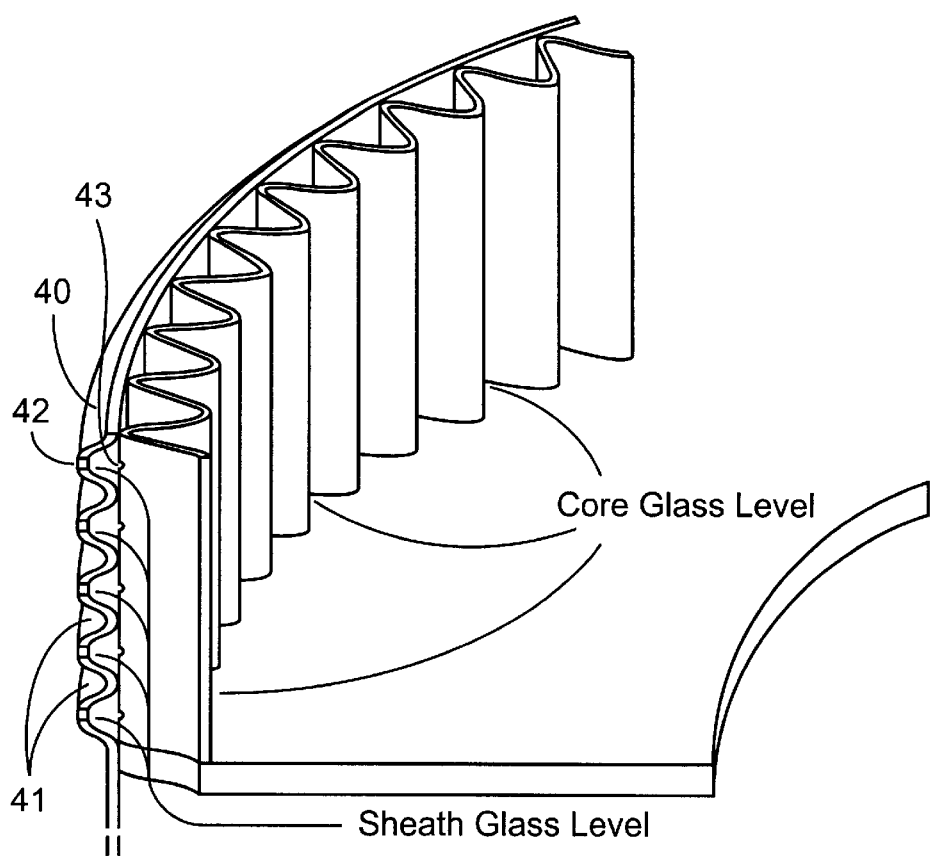
FIGS. 7–9 of the Drawing depict another variation of a spinner useful in preparing the glass fibers of the present invention.
Figure 8:
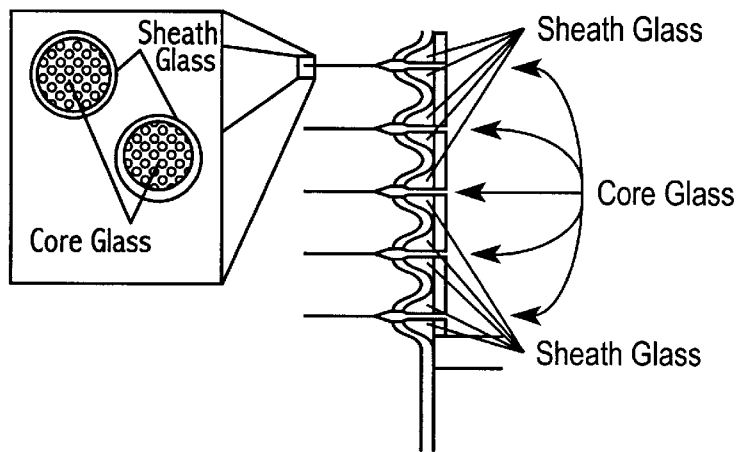

FIG. 7 shows still a further variation on the spinner design. In this design, the external sidewall 40 of the spinner is not smooth but consists of horizontal corrugations 41. The outermost crests of the corrugated sidewall contain holes 42 that are opposite holes 43 in the core-glass compartment. These corrugations offer positive flow control for the sheath glass, limiting flow to the holes to a predominately lateral direction. Because of the forces on the glass due to spinner rotation, the sheath class entrains the core-glass streamlet from the companion hole as it exits each external hole, even though the core-glass hole is not in very close proximity to the external hole, as illustrated in FIG. 8. Of course, as shown in FIG. 9, extensions 45 to the core-glass holes are within the parameters of this design, as they are in the design of FIG. 4.

FIG. 8 graphically portrays the glass flow and fiberization patterns anticipated in the spinner design of FIG. 7. The cross-section of the fiber would reveal either a coaxial arrangement of the core and sheath glasses if the companion holes in the spinner are aligned on the same radial extension from the centerline of the spinner disk or an offset arrangement if the two holes are not so aligned. These kinds of cross-sectional arrangements would be expected from the other spinner and pot designs described as well.

In all of the above spinner designs, and as further illustrated in FIG. 10, the sheath glass is inhibited from passing across an exit hole and thus disturbing or diverting the radial or outward movement of core-glass streamlets intruding into the sheath glass regions of the spinner. As long as there is sufficient space between the core and sheath glass compartments to permit the sheath glass to move vertically against the external sidewall and it does not move over an exit hole, the design conforms to the expectations of this disclosure. For example, it is possible to have a relatively simple design consisting of smooth cylindrical walls for the core and sheath glass compartments. To impede the flow of sheath glass over the exit holes and control the flow of the core glass in the space occupied by the sheath glass, the core glass sidewall contains tips or other protrusions at the core glass holes.

FIG. 10 also illustrates different lengths of the internal tips. The length of the internal tips on either a disk or pot can be important in positioning the core glass in the fiber, depending on the relative viscosities of the two glasses, among other factors. For example, it may be desirable for an internal tip to penetrate the external hole (or even extend beyond the hole—not shown) if the viscosity of the core glass is much lower, i.e., it is more fluid, than the sheath glass at the exit temperature.

As with the pots, it is understood that filaments emanating from the holes 30 in the external walls 29 of the spinners shown in FIGS. 4, 5, 6, 7, 8, 9, and 10 are subjected to secondary attenuation (not shown) to form fibers. Typically this secondary attenuation occurs through the impact of high-velocity hot gases directed vertically downward on the filaments a short distance outside the walls 29. The filaments are stretched to a finer diameter but maintain the same core-sheath relationship shown in FIG. 8.

The principal advantages of offset core/sheath cofiber over side-by-side cofibers include:

The core/sheath fiber can theoretically accommodate relatively weak high-shrinkage glasses in its core, advantageously for bio-soluble fibers.

The core/sheath approach can theoretically make use of two biosoluble glasses or, because of the stress patterns within the fiber, a biosoluble core glass and a more durable sheath glass. The solution of the core glass can distort the sheath glass "shell" and promote mechanical breakdown of the residual glass in the lungs.

A phosphate glass with very high thermal contraction in conjunction with a borosilicate glass with low contraction would be a good combination for such fibers, but the former type of glass is generally sensitive to moisture in the air. However, this combination is conceptually possible in a core/sheath fiber due to the encapsulation of the weaker phosphate glass by the borosilicate glass.

Rotary fiberization produces a structurally weaker single-glass fiber than pot-and-marble flame attenuation. The rotary fiberization of two side-by-side glasses also produces weak fibers structurally. But the rotary fiberization of core/sheath glasses can produce strong fibers (even if both glasses are biosoluble) and thus yield fibrous products with the tenacity and strength of single-glass pot-and-marble materials.

The invention is further illustrated in the following Examples in which all parts and percentages are by weight unless otherwise stated.

EXAMPLE 1

Procedure

A pot to produce the core/sheath fibers was designed to fit in a standard pot housing. As shown in FIG. 1, it consisted of two compartments, an outer annular space devoted to the core glass and a center compartment for the sheath glass. A tall, slightly conical band of inconel sheet metal divided the two compartments. One inch above the inside base of the pot and around its perimeter was an inconel ring containing inconel tips (0.154" I.D.) which were used to convey the core glass to the tops of counterbored orifices (0.205" dia.) that produced the glass primaries (FIG. 2). A slight space between the bottom of the tips and the top surface of the bottom plate allowed the sheath glass to feed the orifices from around the core glass. The ring and the bottom plate of the pot each contained 100 holes arranged evenly in two circles. The circles of holes in the ring were rotated 0.25 degrees from the bottom holes so that more sheath glass entered the orifices on one side of the core glass stream than on the other. Because there was only a one-inch band of metal around the pot in contact with the sheath glass and this was at the bottom of the pot, the pot was elevated and the pot bottom recessed to expose that portion of the sheath class directly to the pot burners.

Eight different glass combinations were run through the pot. The properties of the glasses used are shown in Table 1 below.

TABLE 1

Examples
Representative Properties of Selected Glasses

| Component | A | B | C | D | E | F | G | H | I |
|---|---|---|---|---|---|---|---|---|---|
| $SiO_2$ | 57 | 67.1 | 63.8 | 58.2 | 58.1 | 53.1 | 64.6 | 64.5 | 58.1 |
| $Al_2O_3$ | 5 | 1.84 | 4.6 | 5.8 | 2.02 | 6.44 | 2.22 | 2.34 | 5.19 |
| CaO | 8 | 4.65 | 4.73 | 2.1 | 6.17 | 3.48 | 0.14 | 3.46 | 6.25 |
| MgO | 4 | 3.26 | 3.27 | 0 | 4.29 | 0.66 | 5 | 2.43 | 1.98 |
| $Na_2O$ | 17.5 | 15.6 | 17.1 | 13 | 17.8 | 7.49 | 14 | 13.2 | 8.86 |
| $K_2O$ | 0 | 0.36 | 0 | 0 | 0.41 | 1.1 | 1.12 | 0.5 | 0.97 |
| $Fe_2O_3(FeO)$ | 0 | 0.054 | 0.2 | 0 | 0.33 | 0.066 | 0.037 | 0.018 | 0.047 |
| $B_2O_3$ | 8 | 7.09 | 6 | 11.3 | 6.3 | 19.1 | 12.7 | 8.94 | 18.4 |
| BaO | 0 | 0.001 | 0.3 | 5 | 0.51 | 5.31 | 0.023 | | 0.005 |
| ZnO | | 0.001 | | 4 | 0.095 | 2.65 | 0.056 | 0.001 | 0.004 |
| $F_2$ | | | | 0.6 | | 0.82 | | | 0.015 |
| SrO | | 0.004 | | 0 | 0.01 | 0.137 | 0.001 | 0.002 | 0.004 |
| $TiO_2$ | | 0.019 | | 0 | 0.013 | 0.009 | 0.006 | 3.89 | 0.005 |
| $ZrO_2$ | | 0.046 | | | 3.99 | 0.003 | 0.099 | 0.005 | 0.089 |

TABLE 1-continued

Examples
Representative Properties of Selected Glasses

| Component | A | B | C | D | E | F | G | H | I |
|---|---|---|---|---|---|---|---|---|---|
| $P_2O_5$ | | 0.009 | | | | | 0.028 | 0.013 | 0.007 |
| $Li_2O$ | | | | | | | | 0.69 | 0.004 |
| Total | 99.6 | 100.0 | 100 | 100 | 100.0 | 100.4 | 100.0 | 100.0 | 99.9 |
| Measured Thermal Expansion Coefficient ($\times 10^{-7}/°$ C.) | 88–94 | 90.1 | 90 | 86 | 107 | 71.3 | 77.9 | 85 | 67.5 |
| High Temperature Viscosity (HTV)(° F.) | 1820 | 1965 | 1970 | 1965 | 1872 | 1903 | 1945 | 1918 | 1955 |
| Glass Transition Temperature ($T_g$)(° C.) | 540 | 582.5 | 540 | 535 | 561.2 | 551.6 | 575.9 | 570 | 587 |
| Liquidous Temperature (° F.) | 1690 | 1339 | 1690 | <1500 | 1535 | 1493 | 1587 | 1537 | 1668 |
| Thermal Expansion Coefficient above $T_g$ ($\times 10^{-7}/°$ C.) | 383 | | | 647 | 584 | | | | |

In each of the combinations, the glass with the lower measured coefficient of thermal expansion was placed in the center compartment to form the sheath of the fiber. At first, glasses with nearly the same HTV were paired, but the rate of core glass flow was much less than the sheath glass flow; as a result, many subsequent pairings had core glasses with HTV's on the order of 100 F. degrees less than that of the sheath. At one point during the series of runs, the air:fuel ratio of the pot combustion mixture was altered to demonstrate how the relative rates of core and sheath glasses with equivalent HTV's are changed. Finally, the part of the pot casing that elevated the pot bottom was removed so that the pot bottom was flush with the pot ring: the purpose for doing this was, again, to demonstrate how the flow rates of the two glasses were affected. Process details for the various runs are presented in Table 2 below:

TABLE 2

Process Parameters for Core-Sheath Glass Fiberization

| Fiber | Core Glass | Sheath Glass | Pot Pressure (ref) (in $H_2O$) | Pot Air:Gas (% comb) | Pot Bottom Temp (ref)(° F.) | BN Burner Slot | Burner Air Flow (cu.ft./min.) | Burner Air Temp. (° F.) | Burner Air:Gas (% comb) | Primary Pull Rate (ft/min) | Glass Pull Rate (lb/hr) | Fiber Sample No. | A-Scale Micronaire Diameter (micro-inch) |
|---|---|---|---|---|---|---|---|---|---|---|---|---|---|
| 1 | B | H | 1.95 | 0.9 | 1589 | 1/2" × 8-1/2" | N.D.(1) | 97 | 0.1 | 11.8 | 9.3 | 1 | 115 |
| | | | | | | | | | | | | 2 | 109 |
| 2 | E | H | 1.9 | 1 | 1596 | 1/2" × 8-1/2" | N.D.(1) | 97 | 0.1 | 11.8 | N.D. | 1 | 100 |
| | | | | | 1598 | | N.D.(1) | 106 | 0.1 | 11.8 | 9.1 | 2 | 65 |
| 3 | A | I | 1.8 | 0.9 | 1622 | 1/4" × 9-3/8" | 113 | 104 | 0.6 | 11.8 | N.D. | 1 | 62 |
| | | | | | | | | | | | 6.72 | 2 | 54 |
| 4 | A | D | 1.7 | 1.1 | 1613 | 1/4" × 9-3/8" | 108 | 101 | 0.1 | 11.8 | 9.12 | 1 | 98 |
| | | | | | | | | | | | | 2 | 88 |
| | | | | | | | | | | | | 3 | 83 |
| 5 | B | G | 1.7 | 0.6 | 1604 | N.A.(2) | N.A. | N.A. | N.A. | 11.8 | 8.4 | 1 | Primaries only |
| | | | | | 1602 | | | | | 11.8 | 8.4 | 2 | (3) |
| | | | | | 1589 | | | | | 11.8 | 5.6 | 3 | Primaries only (3) Primaries only (3) |
| 6 | B | G | 1.7 | 1.4 | 1596 | N.A.(2) | N.A. | N.A. | N.A. | 12 | 7.44 | 1 | Primaries only |
| | | | | | 1595 | | | | | | 7.44 | 2 | (3) |
| | | | | | N.D. | | | | | | 5.88 | 3 | Primaries only (3) Primaries only (3) |
| 7 | B | G | 1.7 | 0.2 | 1609 | N.A.(2) | N.A. | N.A. | N.A. | 12 | 8.64 | 1 | Primaries only |
| | | | | | 1608 | | | | | 12 | 8.58 | 2 | (3) |
| | | | | | 1605 | | | | | 12 | 6.24 | 3 | Primaries only (3) Primaries only (3) |
| 8 | B | G | 1.7 | 0.6 | 1580 | N.A.(2) | N.A. | N.A. | N.A. | 12 | 9 | 1 | Primaries only |
| | | | | | 1572 | | | | | 12 | 8.52 | 2 | (3) |
| 9 | E | B | 1.8 | 0.5 | 1557 | 1/4" × 9-3/8" | 119 | 104 | 0.3 | 11.9 | 9.24 | 1 | 104 |
| | | | 1.8 | 0.55 | 1547 | | 113 | 106 | 0.3 | 12 | 6.24 | 2 | N.D. (4) |
| | | | | | | | | | | | | 3 | 54 |
| 10 | E | D | 1.9 | 0.6 | N.D.(5) | N.A. | N.A. | N.A. | N.A. | N.A. | N.D.(5) | | |

(1) N.D. = Not Determined due to malfunctioning gauge
(2) N.A. = Not Applicable
(3) No fibers were produced
(4) N.D. = Not Determined. Sample size too small.
(5) N.D. = Not Determined. Primaries too brittle for processing.

DETAILED DISCUSSION OF RESULTS

Sheath, H; Core, B

The first glass combination consisted of glass H for the sheath (center compartment) and glass B marbles for the core (annular compartment). Primaries were formed. They laced in guides easily, and produced relatively coarse fiber felts, with micronaire diameters of 10.9 to $11.5 \times 10^{-5}$ in., at 9.3 lb/hr pot pull rate. A relatively low feed rate of marbles into the core-glass compartment of the pot, and the straightness of the primaries coming from the pot, suggested that the core-glass section of the primaries/fibers was very small. This was borne out by optical photographs of cross-sections of the primaries. Based on these pictures, the rate of core glass flow was less than 1/12th of the sheath glass flow rate. A "softer" core glass (lower HTV) would increase the core glass flow rate.

Sheath, H; Core, E

Glass E, in the form of crushed glass particles at least ¼ inch in diameter, was introduced into the perimeter compartment. Glass H remained as the sheath glass. This combination also produced relatively straight primaries that laced in well. Fiber felts with micronaire diameters of 6.5 and $10.0 \times 10^{-5}$ inches were produced at a 9.1 lb/hr rate. Optical photographs of primary cross-sections revealed that the rate of core glass delivery to the fiber was midway between ¼ and ⅓ of the sheath glass rate. The lack of waviness in the primaries was believed related to the fact that in many of the primaries, the core glass is centered. Photos of the bulk fiber showed that the fibers were wavy with occasional beads or enlarged sections at the ends. The frequency of enlarged ends seemed to increase as the fibers became finer. The glass E particles did contain inclusions, and glass inhomogeneities could explain these fiber irregularities.

Sheath, I; Core, E

Glass I wafers were introduced in the sheath compartment, and glass E wafers were introduced in the core glass compartment. The new sheath glass I primaries gained flexibility and strength but remained wavy. In the coarse of the trial the sheath glass level was lowered to within five inches of the bottom of the pot in an attempt to increase the relative amount of core glass in the primaries. Doing this also reduced the diameters of the primaries, but they still yielded fiber. The primaries both before and after the level of glass I was reduced, were slightly to severely oblong in cross-section. The volume of sheath glass relative to core glass in the primaries dropped from 4.25:1 to 2.8:1 by dropping the sheath glass level. It was noted that some of the glass E wafers "bridged" (fused together above the glass melt line to form a rigid structure between the walls of the compartment), creating air pockets underneath. To prevent bridging, the glass was hand fed to the compartment below the level where it normally fused. The sheath glass in the central compartment showed no sign of bridging.

Sheath, I; Core, A

The primaries were highly curved, so much so that it was necessary for course-fiber production to thread each one through a separate hole in an auxiliary Teflon™ guide above the standard top guide to keep them properly aligned in the pull rolls. Using a lower guide with deep U-shaped grooves kept the primaries from crossing between the pull rolls and the burner flame. Despite their curvature, the primaries fed cleanly through the guide system and did not break. The primaries used for the fine fibers did not require the auxiliary guide.

Attenuation was very clean, despite differences in the HTV of the two glasses. Fibers ranging from 5 to $10 \times 10^{-5}$ inches in diameter (micronaire) were formed. As noted in Table 1, fibers at the low end of the diameter range were produced on the 100 hole pot at 6.7 lb/hr. In this case the rates of feed of the sheath and core glasses were very close at 1.2:1. The fibers resemble in cross section the primaries from which they are formed, based on photomicrographs. In making relatively fine fibers, the rate of feed of the sheath glass exceeded that of the core glass by 2.2:1. The bulk fiber was very curly and, by SEM, seemed more uniform in this respect (fewer straight fibers) than other bicomponent products in this series. Felts of this fiber were soft and bulky; they had good tensile strength and could be removed from the collection chain completely, without leaving a residue or requiring a (Reemay) backing, even when formed in very thin webs of "AA" fiber.

Bulk fibers were submitted for in vitro tests and $k_{dis}$ determinations. After 31 days in simulated lung fluid (Gamble's solution), the fiber sample had lost 87% of its weight and produced a $k_{dis}$ of 265 ng/cm²-hr (Table 3 below-Fiber 3). Scanning electron micrographs reveal that most of the fiber had been dissolved except for a thin shell and a portion of the core glass.

TABLE 3

Dissolution Constants of Selected Core-Sheath Glass Fibers

| Sample No. | Description Fiber No./ Sample No. | Dissolution Constant After 31 Days (ng/cm²-hr) | After 8 Days (ng/cm²-hr) | F/S (cm/hr) | Sat/V | Actual Weight Loss of Fiber* (%) | Calculated Weight Loss from Sol'n* (%) |
|---|---|---|---|---|---|---|---|
| 1 | Fiber 4 | 38 | 20 | 0.026 | 39 | 22.2 | 18.2 |
| 2 | | 42 | 27 | 0.026 | 39 | 23.4 | 20.3 |
| 3 | | 40 | 31 | 0.026 | 38 | 16.4 | 19.2 |
| | Average | 40 | 26 | 0.026 | 39 | 20.6 | 19.2 |
| 1 | Fiber 3 | 258 | 287 | 0.025 | 39 | 79 | 90.2 |
| 2 | | 274 | 289 | 0.024 | 41 | 91.6 | 94.6 |
| 3 | | 262 | 265 | 0.024 | 41 | 89.2 | 95.2 |
| | Average | 265 | 280 | 0.024 | 40 | 86.6 | 93.3 |

*after 31 days.

Sheath, D; Core, A

Marbles of glass D were fed into the sheath glass compartment and large particles of glass A continued to be fed below the fusion line in the annular compartment. The purpose of this exercise was to see how the introduction of a core glass with high biosolubility affects the overall biosolubility of a fiber with a fairly biodurable sheath glass. Despite similarities in the coefficients of thermal expansion and transition temperatures of the two glasses, their primaries were wavy and required use of the Teflon™ guides and a burnoff guide to keep them aligned and separated for attenuation. Analysis of the primary cross-sections revealed that, on average, the core glass only occupied 22% of the total volume of the fiber; in other words, the ratio of sheath glass to core glass flow was 3.5:1. The fiber produced was in the "A" diameter range. Like the fiber felts of the preceding glass couple, the felts of glass D/A were strong, soft, and buoyant and came cleanly off the collection chain.

In vitro test results on this fiber gave an average $k_{dis}$ of 40 ng/cm$^2$-hr after 31 days in Gamble's fluid (Table 3-Fiber 4). Although this is not very high, the dissolution rate is several times greater than that of a typical flame-attenuated sample of glass D with similar diameter distribution. Scanning electron micrographs of the residue suggest that a large percentage of the A core in the fiber may have been consumed in the test. The average weight loss of the fiber after the test (20.6%) is very close to the estimated percent by weight of glass A originally present in the fiber (21.7%).

Sheath, G; Core, B—Ring Balance and Radius-Ratio Investigation

A series of runs were made to demonstrate how certain process factors affect the relative amounts of core and sheath glass in primaries (and by extension, fibers) when the glasses have similar HTV's and transition temperatures. Among the variables were air:fuel ratio, which affects the temperature profile in the pot, and the sheath glass level, which, as the earlier run with glass H and B showed, influences the relative amounts of core and sheath glass in the fibers. In all but the first run in the series, the primaries were separated according to the circle of orifices from which they were drawn. This was done to see how closely the core diameters and the full primary diameters from one circle matched those of the other circle.

The data for this series of runs were analyzed with the following factors and levels:

| Factor | Low Level | High Level |
| --- | --- | --- |
| Sheath Glass Level | Full Pot | 4-3/4 inches above pot bottom |
| Air:Fuel Ratio | 1.4% comb | 0.15% comb |
| Circle of Primaries | Inner | Outer |

The average diameters of sheath (primary) and core glasses, ratios of primary:core diameters, and standard deviations of primary and core diameters were compared. On the basis of the average diameters, the variation in core diameters was not significantly different from run to run or between inner and outer circles of primaries. Reducing the level of sheath glass did result in a lower average fiber diameter, however. The latter was also evident in a radius ratio comparison. When variations were analyzed using the natural logarithm of standard deviation, however, the more reducing burner flame gave a lower variation in all core diameters than the less reducing flame, and the outer circle of primaries had more variation in core diameter than the inner circle. At the 0.15% comb level, the outer circle of primaries had a lower variation in core diameter than the inner circle.

In terms of the averages of all the test data, the highest proportion of core glass in the primaries came about when the air:gas ratio was midrange and the pot was recessed. Conversely, the lowest overall proportion of core glass occurred under the same combustion conditions but when the pot bottom sat directly on the support ring. Lowering the sheath glass level had a combined effect on dropping the proportion of sheath glass in the primaries, reducing the fiber diameter, and raising the actual amount of core glass in the primaries. Altering the glass level had a much greater effect on the proportion of core glass in the primaries than changing the air:fuel ratio or changing the position of the pot in its housing. Although perhaps not statistically significant, the amount of core glass feeding the outer circle of primaries was always higher than that feeding the inner circle with the recessed pot. This could reflect the higher temperatures in the pot at the outer walls of the core glass chamber or it could represent a slightly lower flow rate of the sheath glass around the outer circle of tips relative to the inner ones. After the recess was removed, the inner tips provided a higher proportion of core glass.

Sheath, B; Core, E

Based on the results from the previous set of runs, a separate run was made to determine the effect a core glass with a lower HTV than the sheath would have on the physical properties and uniformity of the primaries made with them. In this run, the bottom of the pot was flush with its support ring (i.e., not recessed) and the air:gas ratio was held at 0.55% combustibles (±0.05%). The role of glass B was changed from core to sheath glass and coarse glass E particles were introduced into the core glass compartment at the melt line. As before, the glass B was delivered in the form of snaplets. This trial differed from the preceding series in that fibers were formed after the second and third sets of primary samples were taken. As in most of the previous fiberization trials, the felts of fiber were soft, strong, and lofty. No residue remained on the collection chain when the felts were removed.

The primaries of this pair were elliptical, especially after the sheath glass level was lowered. As with standard glass primaries, flame attenuation and surface tension produced circular fibers. Ring balance was good throughout the trial, with, only a 4% or less difference between the average diameters of primaries from the two circles. The core diameters were also very uniform with 2.5% or less difference in average core diameters between the two circles of primaries. The primaries in the outer circle were more variable in diameter than those in the inner circle, but, overall, the core diameters were relatively stable in both circles.

Sheath, D; Core, E

This is a variation of the last run. Marbles of glass D were used to make the sheath glass; glass E continued to be introduced as coarse particles in the annular compartment below the melt line. Glass D has nearly the same fiberization properties as glass B; that is, their HTV's and CTE's are very close. But, in the case of this pair, the primaries were too brittle to lace through the guides and pull rolls and no fiber could be prepared. One possible explanation stems from the observation that the glass D $T_g$ of 475 is 26 C. degrees below that of glass E and its linear rate of expansion above the $T_g$ is almost seven times what it is below the transformation temperature. Thus, it is conceivable that as the primaries cool, the core glass hardens first and the sheath glass continues to shrink after it solidifies and cools to room temperature, the sheath glass is under tension and the core glass under compression. This hypothesis is also borne out of photographs of the cross-sections of the primaries, which do show stress lines in the sheath glass from the core to the outside surface. This combination (and order) of glasses is the only one of the runs that did not yield fibers using the pot design in FIG. 1.

EXAMPLE 2

The pot design of FIG. 11 of the Drawing emphasizes increased core-glass flow and increased total glass flow and changes the inconel divider between the core and sheath glass compartments to minimize or eliminate core-glass bridging.

To improve core-glass flow relative to that of the sheath glass, the inside diameter of the core-glass conveying tubes was increased from 0.154 inches to 0.18 inches. In addition, the diameter of the orifices in the bottom of the pot was reduced from 0.205 inches with a 0.330-inch diameter countersink to 0.170-inch diameter with a 0.250-inch diameter countersink. The length and wall thickness of the tubes did not change. In both pot designs, the depth of the countersink was maintained at 0.06 inches.

The first pot of Example 1 had 100 orifices in two circles, 3¼ and 3⅝ inches from the pot center. To increase the total glass flow, the second pot of this Example has 140 orifices in three circles, 3¼, 3⁷⁄₁₆, and 3⅝ inches from the center.

Due to some bowing of the bottom of the first pot, the thickness of the bottom plate and the ring containing the core glass conveying tubes were both increased in the second pot and the recess was eliminated. The bottom plate thickness was increased from 0.25 inches to 0.38 inches and the thickness of the ring was increased from 0.18 to 0.25 inches. (To compensate for the thicker ring, the span between the underside of the ring and the top of the bottom plate was reduced ¹⁄₁₆ inch.).

The 13-inch-tall cone with near-vertical (88) wall that separated the core- and sheath-glass compartments in the first pot was replaced with a funnel-like separator consisting of a 7¼ inch tall cone with 75 wall topped with a 6-inch long×2¼ inch diameter vertical tube. This was done to maximize the feed area for the core class and remove any constricting (inclined) metal surfaces that could contribute to glass bridging at or above the glass fusion line. In production applications, it is preferred that a special marble-drop feeder for the sheath glass be used. It consists of a water-cooled extension tube that fits inside the straight section of the divider and discharges the sheath glass marbles at the break in the funnel. Consistent with process data from the first pot design, the depth of the sheath glass would be maintained at less than that of the core glass.

In both pots, the bottom plate was rotated to achieve a ¹⁄₆₄-inch offset between the centerlines of the tubes and the corresponding centerlines of the orifices beneath the tubes.

Two pairs of glasses were tested with this pot. The first was glass B as the sheath glass and glass E as the core. The second pair consisted of glass Z as the sheath glass and glass B as the core. Representative properties of these glasses are found in Table 4 below. The pertinent physical differences in the two glasses of each pair are indicated in Table 5 below.

TABLE 4

Representative Properties of Selected Glasses

| Component | B | E | Z |
|---|---|---|---|
| $SiO_2$ | 67.1 | 58.1 | 63.3 |
| $Al_2O_3$ | 1.84 | 2.02 | 3.66 |
| CaO | 4.65 | 6.17 | 0.029 |
| MgO | 3.26 | 4.29 | 4.21 |
| $Na_2O$ | 15.6 | 17.8 | 13.31 |
| $K_2O$ | 0.36 | 0.41 | 1.01 |
| $Fe_2O_3$(FeO) | 0.054 | 0.33 | 0.032 |
| $B_2O_3$ | 7.09 | 6.3 | 14.3 |
| BaO | 0.001 | 0.51 | 0.002 |
| ZnO | 0.001 | 0.095 | 0.001 |
| $F_2$ | | | |
| SrO | 0.004 | 0.01 | |
| $TiO_2$ | 0.019 | 0.013 | 0.02 |
| $ZrO_2$ | 0.046 | 3.99 | 0.087 |
| $P_2O_5$ | 0.009 | | 0.009 |
| $Li_2O$ | | | |
| Total | 100.034 | 100.0 | 100.0 |
| Measured Thermal Expansion Coefficient ($\times 10^{-7}/°$ C.) | 90.1 | 107 | 76.9 |
| High Temperature Viscosity (HTV)(° F.) | 1965 | 1872 | 1884 |
| Glass Transition Temperature ($T_g$)(° C.) | 582.5 | 561.2 | 583 |
| Liquidus Temperature (° F.) | 1339 | 1535 | 1303 |

TABLE 5

Property Differences in Core and Sheath Glass Pairs

| Glass Pair (Sheath/Core) | HTV (sheath)- HTV (core) | CTE (sheath)- CTE (core) | $T_g$(sheath)- $T_g$(core) |
|---|---|---|---|
| B/E | 93° F. | $16.9 \times 10^{-7}/°$ C. | 21.3° C. |
| Z/B | −81° F. | $13.2 \times 10^{-7}/°$ C. | −0.5° C. |

In the table, HTV is the reference temperature of fiberization for the glass, the temperature at which the glass viscosity is 1000 poise. CTE is the linear coefficient of thermal expansion. $T_g$ is the temperature at which the glass essentially changes from viscous liquid to solid; it is the point at which there is a shift in the rate of volume contraction. Note that the major difference is in the HTV'S. With the B/E pair, the sheath glass has a higher viscosity at a given temperature than the core glass, whereas, with the Z/B pair, the reverse is true.

The glass B was supplied in the form of marbles; glass E consisted of wafers; glass Z consisted of "snaps" (small wafers) also made in the melter. The glasses were all hand fed into the pot. The sheath glasses were added to maintain a liquid level within one-half inch below the break in the inverted funnel (i.e., eight inches from the bottom of the pot). The core glasses were introduced to maintain a particle level even with the top of the pot (14⅜ inches from the bottom).

RESULTS AND OBSERVATIONS
B Sheath; E Core

B and E were selected as the initial glass pair for the 140-hole pot. The selection was based on first-pot trials, in which the pair formed primaries with irregular core-glass distributions and elliptical cross-sections.

Although the pot was thermally conditioned before use, bubbles of volatile gas developed in the sheath-glass compartment from either the metal sides or tubes. The volume of foam created by the bubbles caused the sheath glass level to rise as much as ¾ of an inch and begin to fill the vertical section of the inverted funnel. Probably as a result of the gas generation, the primaries issuing from the holes in the pot had very rough surfaces and porous interiors. They were essentially too brittle to process. Analysis of the cross-sections of the primaries indicates that the core and sheath glasses had mixed.

Z Sheath; B Core

Once the pot was drained, the two previous glasses were replaced with glass B marbles in the annular compartment and glass Z "snaps" in the center compartment to the bottom of the vertical tube. The sheath glass contained some foam but less than with the first set of glasses. The primaries were curved and required the use of an auxiliary Teflon™ guide to keep them aligned for fiberization. They were flexible enough to lace but still relatively brittle and contaminated with seeds and stones. Because of this contamination, fibers were not produced. A cross-sectional view of the primaries shows that the core glass represents ⅔ of the volume and is heavily skewed to one side. The image also shows that all of the orifices delivered glasses at nearly the same proportionate rates.

Tests on the glass B marbles showed that it was not homogeneous, probably as a result of contamination during melting. The pot was drained and the trial repeated, this time with a batch of glass B marbles known from previous runs to be of good quality. The glass in the primaries continued to carry a preponderance of small bubbles, but the primaries were strong and flexible enough to lace. They were also very wavy and required the auxiliary guide to keep them from interfering with one another above the pull-rolls. Due to difficulties in threading the primaries, only 65 of the 140 were laced and attenuated. These fibers show the same kind of swirling pattern that was observed on core/sheath fiber created with the first pot.

The successful fiberization of glass B inside a wrap of Z glass offers the following conclusions:

1. The second pot used in this Example demonstrated that there is wide latitude in the relative processing properties of glasses that will produce curled-glass fibers. Curled glass fibers can be produced when the sheath glass has a lower HTV than the core glass.
2. Uniform core/sheath primaries can be formed in a production-style pot.
3. The inverted funnel of the second pot alleviated any bridging problem observed in the core-glass compartment of the first pot.

Observations of primary formation and the characteristics of fibers produced from the second pot also supports observations made using the first pot. In spite of differences in HTV and other glass properties, stable primaries form when the sheath glass is under compression. Because glass always breaks in tension at the surface, putting the sheath glass under compression provides insurance against breakage. Based on the similarities in cross-sections between primaries and fibers, it is mandatory for curly fiber production that the primaries be curved as well. However, process control requires that the primaries are straightened so that they can pass through guides and into the burner flame without interfering with one another. The stress state of the primaries permits this. The ability to select and orient feed glasses and thus control the stress distribution within some known constraints in the primaries has been one of the major benefits of the offset core-sheath process.

In eccentric or off-set core-sheaths of the present invention, as in side-by-sides, all of the fibers are curled by an amount dependent on their diameters. In side-by-side glass primaries, one side is always under tension, and a relatively strong glass is needed for this side. In off-set core-sheath production, this limitation is no longer a factor. A comparatively weak glass can serve as the sheath or the core. If the sheath glass is under compression, the eccentric core-sheath process can, theoretically, accommodate pairs of glasses that provide large differential stresses. For example, glasses having a differential coefficient of thermal expansion (CTE) of $60 \times 10^{-7}/°$ C. or more could be coupled.

The effect of controlled fiber curl is manifested in the felts formed in the offset core-sheath process of the present invention. Many of the core/sheath glass pairs produced felts that had excellent integrity, loft, and strength, despite the fact that no binder was used and the fiber was sometimes very fine. In one trial, "AA" fiber was formed in a semi-transparent web on a bare coarse collection chain with no Reemay or other fine-mesh backing material. The web could be removed from the chain without leaving a residue, wound up on a mandrel, and months later, unwound from a roll without tearing or binding with the underlying layer. This quality of core/sheath fiber suggests that the technology could be used to reduce the amount of binder in some products, such as air filter media, where binder is believed to interfere with filtration efficiency. With the right combination of acid-resistant glasses, this same approach could be used to produce a dry-laid battery separator without the need for hydro-entanglement.

While the invention has been described in terms of its preferred embodiments, it is to be understood that various changes and modifications can be made thereto without departing from the spirit or scope of the invention as set forth herein, and that the invention is intended to cover such modification.

What is claimed is:

1. A curly, glass fiber comprising a core/sheath structure having the core off center.
2. The glass fiber of claim 1, wherein the core glass of the structure has a tendency to contract as it cools to a greater extent than the sheath glass of the structure.
3. The glass fiber of claim 1, wherein the core glass of the structure has a lower HTV than the sheath glass of the structure.
4. The glass fiber of claim 1, wherein the core glass has a higher HTV than the sheath glass.
5. The glass fiber of claim 1, wherein the glass fiber has a biodissolution rate of at least 50 ng/cm².hr.
6. The glass fiber of claim 1, wherein the glass fiber has a biodissolution rate of at least 200 ng/cm².hr.
7. The curly glass fiber of claim 1, wherein the core glass has a lower fiberization temperature than the sheath glass.
8. A glass fiber comprising a core/sheath structure wherein the core glass of the structure is a more biosoluble glass than the sheath glass of the structure.
9. The glass fiber of claim 8, wherein the glass fiber has an off-set core.
10. The glass fiber of claim 8, wherein the glass fiber has a biodissolution rate of at least 200 ng/cm².hr.
11. The glass fiber of claim 8, wherein the glass fiber has biodissolution rate of at least 50 ng/cm².hr.
12. The glass fiber of claim 8, wherein the core glass of the structure has a lower fiberization temperature than the sheath glass of the structure.

* * * * *